No. 792,986. PATENTED JUNE 20, 1905.
J. P. HENDERSON.
THRESHING MACHINE.
APPLICATION FILED NOV. 5, 1904.
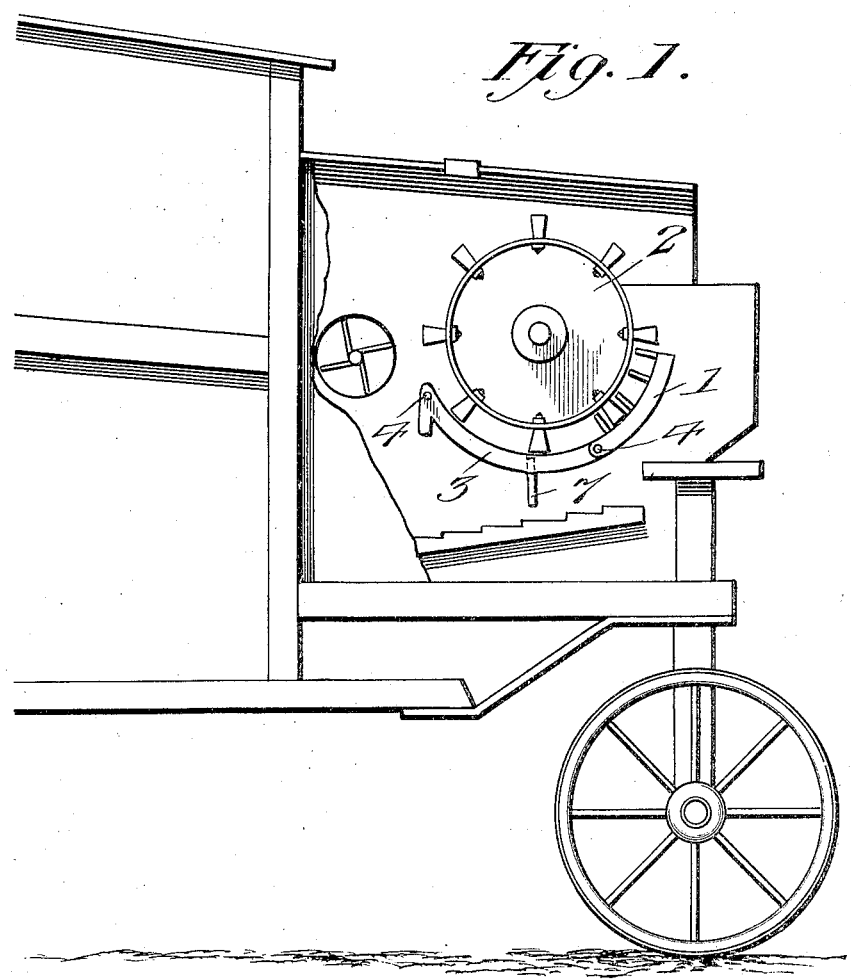
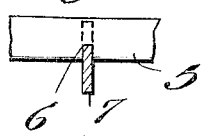
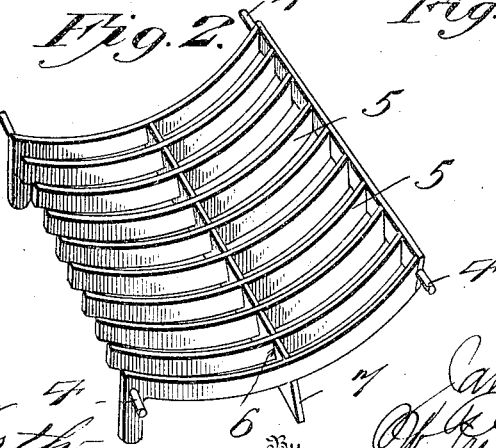
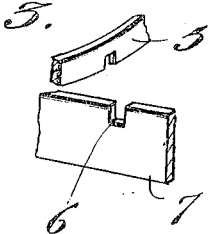
Witnesses
Inventor
James P. Henderson
By
Attorney No. 792,986.

Patented June 20, 1905.

UNITED STATES PATENT OFFICE.

JAMES P. HENDERSON, OF COMPTON, ILLINOIS.

THRESHING-MACHINE.

SPECIFICATION forming part of Letters Patent No. 792,986, dated June 20, 1905.

Application filed November 5, 1904. Serial No. 231,516.

*To all whom it may concern:*

Be it known that I, JAMES P. HENDERSON, a citizen of the United States, residing at Compton, county of Lee, and State of Illinois, have invented a certain new and useful Improvement in Threshing-Machines, of which the following is a specification.

This invention relates to threshing-machines, and it relates more particularly to means whereby the separation of grain from the straw immediately after the latter leaves the concave is facilitated.

The object of the invention is to provide novel means whereby grain carried with the straw after the latter has been subjected to the action of the cylinder in the concave will be prevented from passing with the straw to the straw-decks.

A further object of the invention is to provide a device of this character that will be simple in construction, efficient in practice, and economical to manufacture.

With the foregoing and other objects in view the invention consists in the details of construction and in the arrangement and combination of parts to be hereinafter more fully set forth and claimed.

In describing the invention in detail reference will be had to the accompanying drawings, forming part of this specification, wherein like characters denote corresponding parts in the several views, in which—

Figure 1 is a fragmentary view of a threshing-machine, one side being removed to show the invention in applied position. Fig. 2 is a perspective view of the invention. Fig. 3 is a fragmentary view in perspective of the plate and a bar detached; and Fig. 4 is a view in section, showing the plate in position.

In the drawings, 1 indicates the concave, and 2 the cylinder, which is suitably mounted in proper operative position with relation to the concave. Adjacent to and forming a continuation of the concave is a grate or grid 3, over which the straw and grain passes immediately after the straw is subjected to the action of the cylinder 2. The grid 3 is held in position by means of the lugs 4, formed on each side thereof at or near the ends, said lugs being suitably secured to the frame of the machine. The strips 5 of the grate 3 are provided at the under side and approximately midway their length with slits or notches 6, adapted to receive an end portion of a depending plate or apron 7. This plate is preferably on a slight incline; but it may of course be arranged on any angle to meet the circumstances of practice, it being found advantageous to have the apron depending perpendicularly when the said grid is in its operative position. The upper edge of the apron or plate 6 is slightly below the upper plane of the strips 5 of the grid 3.

In practice the greater portion of the grain separated from the straw falls through the concave to the shaking-pan directly below. The movement of the straw toward the straw-decks has a tendency to draw a considerable quantity of the grain therewith, this being prevented by the depending plate or apron. The grain comes into contact with the plate or apron and is arrested and causes it to fall upon the shaking-pan.

The construction, operation, and advantages will, it is thought, be understood from the foregoing description, it being noted that various changes may be made in the proportions and details of construction for successfully carrying the invention into practice without departing from the scope thereof.

Having fully described my invention, what I claim as new, and desire to secure by Letters Patent, is—

1. In a threshing-machine, the combination with a concave and cylinder, of a grate arranged adjacent to the said concave and a plate depending from said grate; said plate being positioned approximately centrally of the grate and interlocking with the grate.

2. In a threshing-machine, the combination with a concave and cylinder, of a grate arranged adjacent to the said concave, the strips of the grate being provided with notches, and a depending plate having its edge fitting in said notches.

3. In a threshing-machine, the combination with a concave and cylinder, of a grate arranged adjacent to the concave and a depending plate arranged intermediately the grate and interlocking therewith, the upper edge of said plate being slightly below the upper plane of the grate.

In testimony whereof I have hereunto affixed my signature in the presence of two subscribing witnesses.

JAMES P. HENDERSON.

Witnesses:
　ROBERT HAUGH,
　LAFAYETTE CAMDEN.